March 9, 1954 — C. H. PAGE — 2,671,882

ALTERNATOR

Filed April 14, 1944

INVENTOR
CHESTER H. PAGE
BY W. Glenn Jones
ATTORNEY

Patented Mar. 9, 1954

2,671,882

UNITED STATES PATENT OFFICE 2,671,882

ALTERNATOR

Chester H. Page, Providence, R. I., assignor to the United States of America as represented by the Secretary of the Navy Application April 14, 1944, Serial No. 530,999

3 Claims. (Cl. 322—90)

(Granted under Title 35, U. S. Code (1952), sec. 266)

This invention relates to alternators and especially to an alternator with phase-controlled voltage regulation.

An object is to provide an alternator which is capable of self-regulation of its own voltage output within narrow limits, over a considerable range of speed.

Another object is to provide an alternator of the character indicated which is easily manufacturable in small sizes and which is of simple construction.

A further object is the provision of an alternator with asymmetrically placed field windings, so disposed that a phase difference between voltages induced in the windings can be used to regulate the voltage output of the alternator.

Still another object is to provide such an alternator which is especially adapted to generate current for supplying the filament and plate circuits of vacuum tubes.

Other objects will appear in the specification.

In the drawings, Fig. 1 is a view partly in section and partly in elevation looking along the axis of an alternator with permanent magnet rotor and asymmetrically placed windings; duplicate field poles being indicated in dotted lines.

Figure 1:
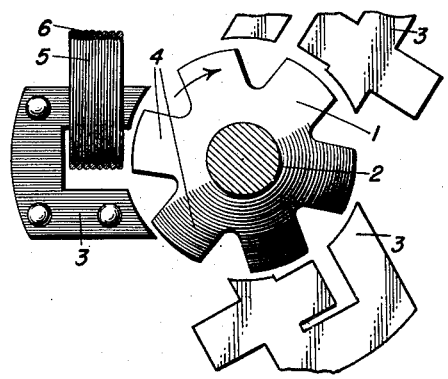

In Fig. 1, rotor 1 consists of a plurality of permanent magnet poles, preferably made of "Alnico" or similar material and fastened to shaft 2 which may be rotated in any suitable manner. Field yoke 3 is made of iron or steel of good magnetic permeability so that a substantial field flux will be established in the core 3 and in any two oppositely polarized arms as 4 of rotor 1, when the two arms are in register with the ends of the yoke. Plate voltage or high voltage coil 5 consisting of many turns of fine wire is wound on the lagging leg of yoke 3 and filament-voltage or low voltage coil 6, consisting of relatively few turns of somewhat coarser wire, is wound over coil 5 as indicated.

As indicated in Figure 1, three field yokes, and three double field coils of the form described wound on the lagging legs of the yokes, give satisfactory results when used in conjunction with a six-pole rotor. The plate voltage coils are connected in series and the filament voltage coils are likewise connected in series.

In a conventional alternator with adjacent low voltage and high voltage coils such as might be used to supply the filaments and plates of vacuum tubes, there is a certain degree of regulation due to the fact that the low voltage winding has relatively little inductance and the high voltage winding of many turns has appreciable inductance, especially for heavy loads or for high rotor speeds. In such a case the current lags the E. M. F. induced by the rotor in the high voltage winding by approximately 90°, and the transformer E. M. F. induced in the low voltage winding by current in the high voltage winding lags the current in the high voltage winding by about 90° also so that the rotor-induced E. M. F. in the filament or low voltage winding is opposed by the transformer induced E. M. F. lagging the former by 180°. The plate current, at low speeds, is substantially in phase with the rotor-induced E. M. F. and the transformer E. M. F. in the filament winding lags the rotor induced E. M. F. by 90°. As the rotor speed is increased however, this phase shifts from 90° to 180° approximately and results in an opposing E. M. F. as described, the counteracting E. M. F. increasing in magnitude as the generated E. M. F. tends to increase due to faster rotation of the rotor. Therefore a regulating effect is produced.

If there is a phase difference between the rotor-induced E. M. F.'s in the two windings the regulation is altered. If the rotor-induced E. M. F. in the filament winding lags that in the plate winding the transformer E. M. F. induced in the filament winding is less than 90° behind the rotor-induced E. M. F. at low speed and the opposing E. M. F. is developed at a higher speed than in the case described, in which there was no phase difference between rotor-induced E. M. F.'s. The lower limit of the operating speed range is therefore raised for given circuit components.

If, however, the rotor-induced E. M. F. in the filament winding leads that induced in the plate winding, the opposition E. M. F. is begun at a lower speed than if the rotor-induced E. M. F.'s are in phase and accordingly, the lower limit of the operating speed range is reduced. This condition allows greater freedom in the selection of regulation circuit components. The power loss in the regulation circuit is small and the regulation is not sensitive to component tolerances.

The rotor-induced E. M. F. in the filament winding can be caused to lead the rotor-induced E. M. F. in the plate winding by means of an asymmetrical arrangement as illustrated in Fig. 1. It will be noted that only one leg of field core 3 is wound and filament winding 6 consists of only a few layers over plate winding 5 which is distributed over a considerable radial thickness. If then, rotor I is revolved in the direction of the arrow, the flux lines from the rotor poles will completely link filament winding 6 before they are fully linked with distributed coil 5. Therefore the maximum E. M. F. induced in filament winding 6 will lead the maximum E. M. F. induced in plate winding 5, which occurs when a pair of rotor poles are in registry with the legs of yoke 3. Just prior to this position there is considerable leakage flux, to the stator, which is distributed through the plate-voltage winding but which is completely linked by the larger diameter filament winding. The corresponding effect does not occur as the pole leaves the stator since the lagging side of the coil is relatively remote from the rotor. The amount of phase difference appears to depend upon the relative width of the pole face and the stator face.

Figure 4:
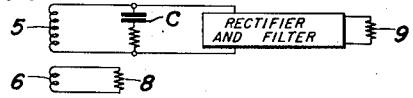
Fig. 4 is a schematic diagram illustrating more or less conventionally a typical shunt-connected voltage regulation circuit together with a load, represented diagrammatically.

It will be understood that the plate current supplied by the field windings as 5 may be led through a suitable regulating capacitor C, filter and rectifier means, as schematically shown in Fig. 4. Fig. 4 indicates the loads served by the generator schematically, by the representation of resistors 8, 9.

Figure 2:
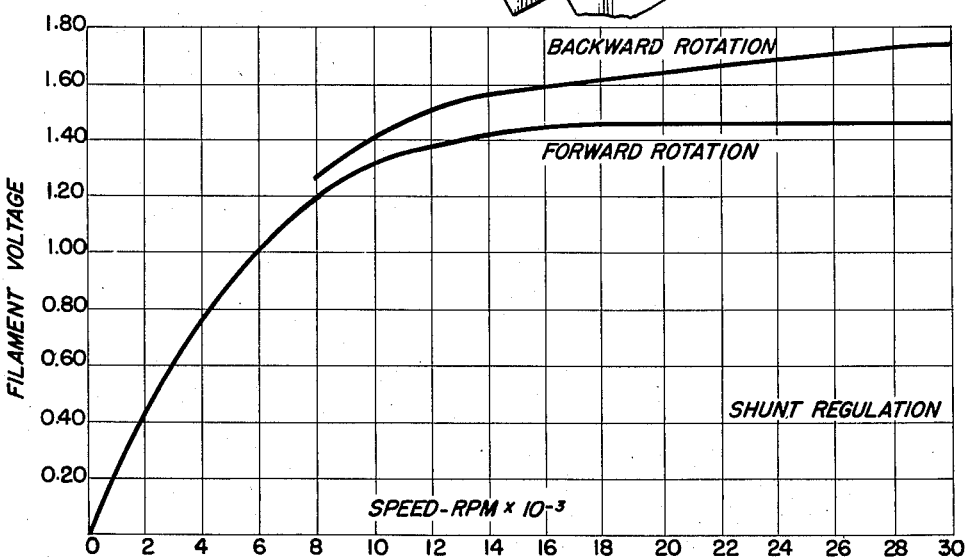
Fig. 2 is a graph showing filament voltage-speed curves for forward and backward rotation of the rotor of an alternator with shunt-connected voltage regulation circuit constructed in accordance with the present invention.
Figure 3:
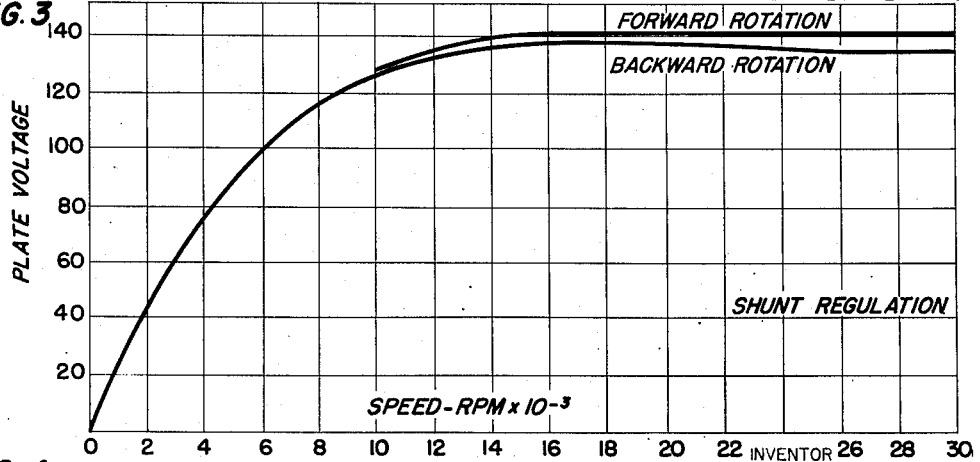
Fig. 3 is a similar graph showing plate voltage-speed curves under equivalent conditions.

Figs. 2 and 3 indicate typical characteristics obtainable with a generator constructed in accordance with my invention, with shunt regulation such as is illustrated in Fig. 4. I have found that good regulation is obtained by use of an assymmetrical structure as described, when the rotor is revolved in the proper direction as indicated by the arrow. Reversal of direction of the rotor, however, produces poor regulation of filament voltage although the plate-voltage curve is not significantly changed, as shown by the curves of Figs. 2 and 3, which are self-explanatory.

Although I have shown a preferred embodiment of my invention I do not wish to be limited by a detailed interpretation thereof, but only by the spirit and scope of the subjoined claims.

The invention herein described may be manufactured and used by or for the Government of the United States of America for governmental purposes without the payment of any royalties thereon or therefor.

I claim:

1. In an alternator having a multipole rotor adapted to be rotated in one direction, a field core having two yoke arms positioned parallel to a plane passing through the axis of rotation of said rotor and through the geometrical center of said core, the open ends of said yoke arms positioned to confront the outer circumference of said rotor and spaced apart a distance equal to the circumferential spacing between any two poles of said rotor, a high voltage winding carried by the yoke arm last approached by any one of said poles during rotation past the said yoke arms, a low voltage winding concentrically surrounding said high voltage winding to inductively couple said two windings and to space said low voltage winding at a greater radial distance from said yoke arm than said high voltage winding, said low voltage winding being completely linked by flux produced by cooperating poles of said rotor prior to the complete linking of said high voltage winding to provide that the peak voltages in said two windings will be angularly displaced.

2. In an alternator having a multipole rotor adapted to be rotated in one direction, a field core having two yoke arms at least one of which arms extends in a direction angularly displaced from the radial line of said rotor at said one yoke arm, the open ends of said yoke arms positioned adjacent the outer circumference of said rotor and spaced apart a distance equal to the circumferential spacing between any two poles of said rotor, said angularly disposed yoke arm being the last yoke arm approached by any one of said poles during rotation past the said yoke arms, a high voltage winding carried by said angularly displaced yoke arm, a low voltage winding concentrically surrounding said high voltage winding so that said low voltage winding is completely linked by flux from cooperating poles of said rotor prior to the complete linking of said high voltage winding.

3. A generator comprising a stator winding, a rotatable permanent magnet rotor constructed and arranged for furnishing flux which links the winding in a manner to induce an E. M. F. therein proportional to rotor speed within a pre-selected range, a second winding inductively related to said stator winding, and a capacitor constructed and arranged in circuit with said second winding to produce a current therethrough having a time relationship with respect to the output current through said stator winding to either aid or oppose said current whereby the output is regulated.

CHESTER H. PAGE.

References Cited in the file of this patent

UNITED STATES PATENTS

| Number | Name | Date |
| --- | --- | --- |
| 1,970,327 | Louis | Apr. 14, 1934 |
| 1,980,808 | Leibing | Nov. 13, 1934 |
| 2,117,019 | Conrad | May 10, 1938 |
| 2,218,859 | Schweitzer | Oct. 22, 1940 |

FOREIGN PATENTS

| Number | Country | Date |
| --- | --- | --- |
| 526,686 | Great Britain | Sept. 24, 1940 |